United States Patent [19]

Won

[11] Patent Number: 4,854,190

[45] Date of Patent: Aug. 8, 1989

[54] CONTINUOUSLY VARIABLE GEAR DRIVE TRANSMISSION

[75] Inventor: Vann Yuen Won, Sacramento, Calif.

[73] Assignee: United States of America as represented by the Secretary of the Air Force, Washington, D.C.

[21] Appl. No.: 52,641

[22] Filed: May 20, 1987

[51] Int. Cl.[4] .................... F16H 37/06; F16H 37/08; F16H 3/44; F16H 57/10

[52] U.S. Cl. ........................................ 74/695; 74/686; 74/701; 74/681; 74/793

[58] Field of Search ................. 74/695, 686, 689, 701, 74/793, 681, 802, 700, 745

[56] References Cited

U.S. PATENT DOCUMENTS

| | | | |
|---|---|---|---|
| 339,411 | 6/1943 | Finzi | 74/686 |
| 1,724,714 | 8/1929 | Kersten | 74/675 |
| 2,196,368 | 4/1940 | Thomson | 74/282 |
| 2,292,578 | 8/1942 | McIntyre | 74/695 |
| 2,310,115 | 2/1943 | Popoff | 74/282 |
| 2,332,838 | 10/1943 | Borgward | 74/695 |
| 2,355,000 | 8/1944 | Liebrecht | 74/686 |
| 2,604,798 | 7/1952 | Welsh | 74/705 |
| 2,833,160 | 5/1958 | Morgan | 74/681 |
| 2,847,876 | 8/1958 | Willard | 74/793 |
| 2,895,348 | 7/1959 | Beachler | 74/689 |
| 2,924,122 | 2/1960 | Foster | 74/705 |
| 3,046,814 | 7/1962 | Soehrman | 74/689 |
| 3,299,741 | 1/1967 | Twiford | 74/682 |
| 3,540,311 | 11/1970 | Chillson | 74/797 |
| 3,798,999 | 3/1974 | Fritsch | 74/705 X |
| 4,080,847 | 3/1978 | Thomas | 74/682 X |
| 4,109,551 | 8/1978 | Nemec | 74/705 |
| 4,252,034 | 2/1981 | DeBruyne | 74/675 |
| 4,327,604 | 5/1982 | Evans | 74/793 X |
| 4,354,144 | 10/1982 | McCarthy | 318/13 |
| 4,532,828 | 8/1985 | La Guardia | 74/793 |
| 4,574,656 | 3/1986 | McCarthy | 74/665 M |
| 4,682,511 | 6/1987 | Wittke | 74/681 |
| 4,700,589 | 10/1987 | Coronel | 74/681 X |

FOREIGN PATENT DOCUMENTS

| | | | |
|---|---|---|---|
| 384271 | of 0000 | France | 74/701 |
| 284875 | 1/1953 | Switzerland | 74/686 |
| 460692 | 2/1937 | United Kingdom | 74/689 |
| 2160598 | 5/1985 | United Kingdom | 74/793 |

OTHER PUBLICATIONS

Raia, Ernest, "Continuously Variable Transmissions", High Technology, July 1984, pp. 65-72.

Primary Examiner—Dwight G. Diehl
Assistant Examiner—Christopher Campbell
Attorney, Agent, or Firm—Jules J. Morris; Donald J. Singer

[57] ABSTRACT

The invention comprises an all gear mechanism for a continuously variable transmission that provides a wide range of output speeds and torques. The Basic element of the transmission is a floating gear assembly which relates output speed to input speed. The floating gear assembly can either comprise a floating gearbox or a floating gear arrangement incorporated into a differential assembly with idler gears. Various controlling mechanisms are shown and described which include first and second mechanical feedback loops. With these speed control systems, the output gear ratio can be made to change either linearly to geometrically to produce a desired output speed and torque.

20 Claims, 5 Drawing Sheets

CONTINUOUSLY VARIABLE GEAR DRIVE TRANSMISSION

There have many attempts to produce vehicle drive systems in which the prime mover operates at a constant speed of high efficiency. One example of a successful system of this type is found in large railway locomotives. In these devices, the diesel movers are operated at constant speed and are connected to generators which are used to furnish electrical power to variable speed electric traction motors. While this arrangement has proven useful for very large devices, it is too large and massive for use in smaller industrial devices and automobiles.

Automakers have attempted for many years to provide a continuously variable transmission that would allow high efficiency operation of an automobile engine under high load conditions such as acceleration. The only successful continuously variable transmissions now being used are belt-driven systems that adjust gear ratio through the use of variable diameter pulleys. These belt-drive transmissions have been plagued with relatively low time between overhaul and low reliability, due to excessive wear of the flexible belts connecting the pulleys. Both rubber and metal belts are subject to high tension and bending loads that reduce their life span and subject them to fatigue failure. Although excess tension shortens belt life, belts must be held taut enough to prevent slippage each time a load is applied to the transmission.

Other continuously variable transmission designs that have been developed include hydraulic designs and traction drives that rely on transfer of rotation by means of hydraulic fluid or the interaction of adjacent rotating structures. Both these types of drives, however, are currently unable to supply sufficient torque for automotive or moderately heavy industrial use.

Nearly all these types of devices suffer from the same problems of durability and reliability that have plagued the belt drive systems mentioned above.

In view of the above, a need exists for a reliable and durable continuously variable transmission that can be used to improve the versatility and operating efficiency of internal combustion engines.

SUMMARY OF THE INVENTION

The invention comprises an all gear transmission mechanism capable of producing a wide range of speed outputs, including very high torque at low speed and very high speed at low torque. This result is provided by a combination of epicyclic gearing and differential gearing. The invention also includes an all gear feedback mechanism for sustaining desired operating speeds and torques as well as for performing rapid changes in gear ratio that produce rapid acceleration and deceleration of output shaft rotation.

In a first embodiment of the invention, the gear drive transmission comprises a variable speed drive assembly in which a master gear assembly having an input and output shaft is provided. The master gear assembly comprises an epicyclic, or floating gearbox arrangement and a differential control assembly. The differential gear assembly is mechanically interconnected with the epicyclic gears to provide a mechanical feedback loop between the output shaft and a speed controlling gear in the differential assembly.

In a preferred embodiment (FIG. 3), the master gear assembly comprises a first master gear connected to an input shaft by idler gears. A master control gear is connected to the first master gear by spider gears. A second master gear is also connected to the master control gear by the spider gears. An output gear is affixed to the output shaft and is connected to the input shaft and the second master gear by a planetary idler gear.

An auxiliary differential gear assembly forms a control feedback loop between the output shaft and the master control gear. A speed control shaft is connected to the feedback differential gear assembly for introducing output shaft speed changes into the feedback loop. The feedback differential gear assembly serves to maintain output shaft speed and permit linear cumulative speed changes.

In this embodiment of the invention, the feedback differential gear assembly comprises a first differential gear connected to the master control gear of the master gear assembly. It also comprises a central gear connected to the first differential gear by a spider gear and directly connected to the speed control shaft for rotation thereby. Finally, the feedback differential also comprises a second differential gear that is connected to the central gear by the spider gear, and to the output gear of the master gear assembly, in order to complete the feedback loop between the output shaft and the master control gear.

In another preferred embodiment of the invention (FIG. 4), the continuously variable transmission further comprises an enhanced feedback mechanism for causing geometric acceleration and deceleration changes in output shaft rotation. An enhanced feedback differential control gear is connected to a speed control means and to the central gear of the feedback differential. This enhanced feedback differential is connected to the output shaft gear assembly through its first differential gear and to the control central gear of the feedback differential to complete an enhanced feedback route.

In an embodiment incorporating both the feedback and the enhanced feedback differential assemblies, output speed changes can be made either linearly or geometrically through the use of speed control gears and electric clutches. When linear changes are to be made, an electric clutch disengages the enhanced feedback differential gearbox and speed changes are made by direct rotation of the central control gear of the feedback gearbox. When geometric speed changes are to be made, they are made through the central control gear of the enhanced feedback differential and propagated through a feedback loop that includes the feedback differential.

Another aspect of the preferred embodiment of the invention is the use of a takeoff assembly from the input shaft rotation means to provide power for the speed control means. This takeoff means preferably includes a speed reduction gearset and an electrically controlled reversing mechanism, so that a speed control shaft can be rotated in either direction.

In view of the above, it is an object of this invention to provide a continuously variable transmission which utilizes an all gear drive and mechanical feedback loops.

It is also an object of this invention to provide a reliable and durable continuously variable transmission.

It is yet a further object of this invention to provide a mechanism that is comparatively simple, lightweight and energy efficient.

BRIEF DESCRIPTION OF THE DRAWINGS

The foregoing objects and other advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
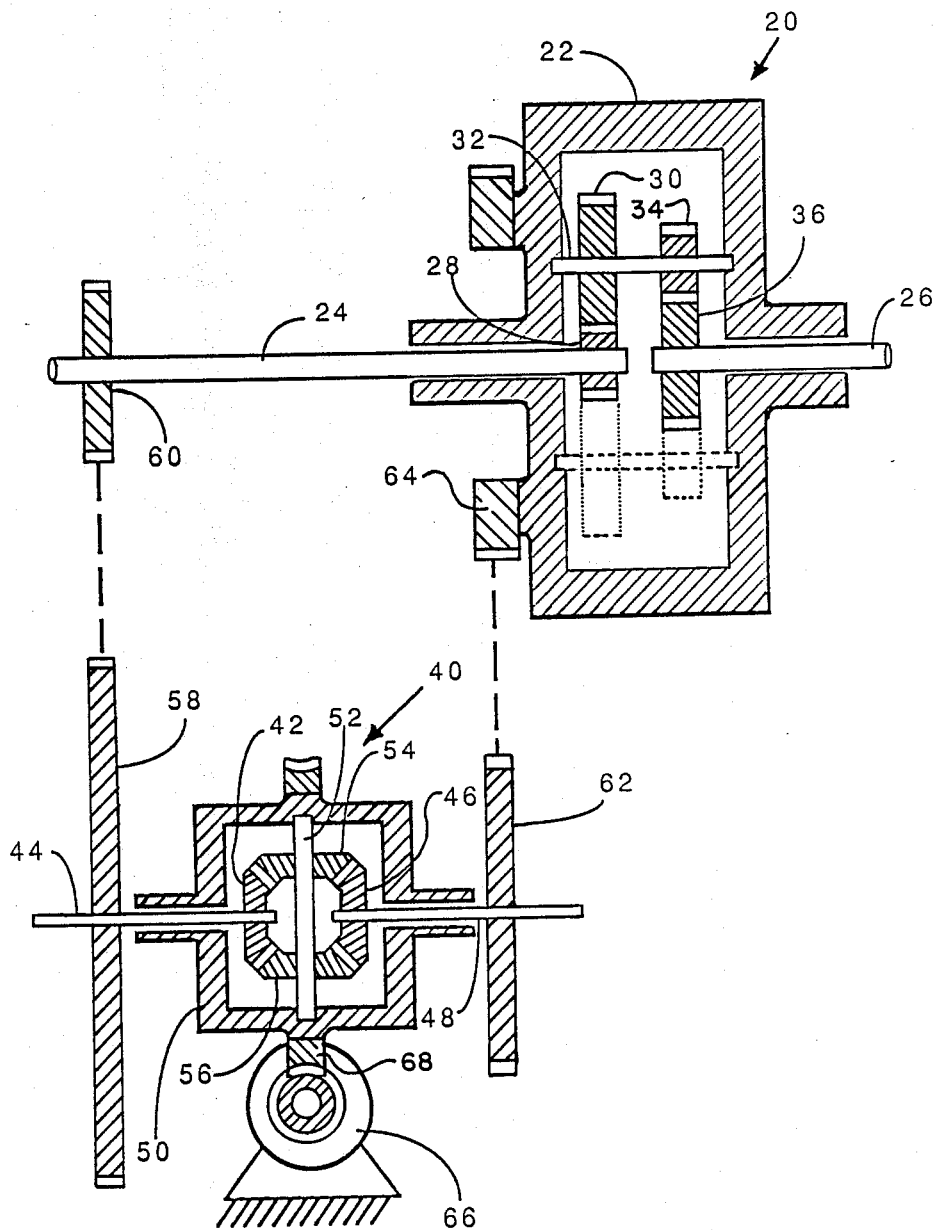
FIG. 1 is a simplified cross-sectional view of a variable speed gear assembly which incorporates a floating gearbox assembly and a differential assembly.

The invention comprises an all gear mechanism for a continuously variable transmission that provides a wide range of output speeds and torques. The basic element of the transmission is a floating gear assembly which relates output speed to input speed. The floating gear assembly can either comprise a floating gearbox or a floating gear arrangement incorporated into a differential assembly with idler gears. Various controlling mechanisms are shown and described which include first and second mechanical feedback loops. With these speed control systems, the output gear ratio can be made to change either linearly or geometrically to produce a desired output speed and torque.

A fixed 10:1 conventional reduction gearbox delivers one-tenth the input speed and ten times the input torque at the output shaft. Such a gearbox can also be built as a rotatable, floating structure like that shown as floating gearbox 20 of FIG. 1. The floating gearbox is capable of two different movements. When the gearbox case 22 is held motionless, a ten rpm input on shaft 24 will result in a 1 rpm output at shaft 26. This is the conventional use of a 10:1 reduction gearbox. If, however, the output shaft 26 is held motionless, then the rotatable gearbox case 22 revolves against the holding load at −1 rpm (reverse direction). This is as a result of the operation of the internal gears and shafts as they rotate in orbit about each other.

Input shaft 24 of the floating gearbox passes through gear box case 22 and has mounted upon is a sun gear 28 which meshes with planetary idler gear 30. Planetary gear 30 rotates upon shaft 32 which also holds planetary idler gear 34. Planetary idler gear 34 rotates with shaft 32 against output sun gear 36, which is attached to the output shaft 26. When the gearbox is held motionless, shaft 32 is non-orbital and the gears all rotate about their axis, with gears 30 and 34 behaving as joined idler gears rotating shaft 32. When the gearbox case 22 is allowed to rotate, shaft 32 orbits about shafts 24 and 26 allowing gears 30 and 34 to act as planetary gears which orbit about sun gears 28 and 36. Therefore, when the output shaft 26 is held motionless, the gearbox motion is equal in speed but opposite in direction to conventional output shaft rotation. When the gearbox rotation is controlled by an impressed load, the output of the floating gear train in the transmission will trim itself to the fastest speed at which the output shaft can overcome torque load applied to it. In the device of FIG. 1, a differential gear assembly 40 is used to control the floating gear train 20 in order to establish a desired output speed and torque.

The differential 40 has a side gear 42 that is attached to an input shaft 44 which can be considered the differential input. A second side gear 46 is fixedly attached to an output shaft 48. The two side gears iteract through bevel gears 54 and 56, which rotate about the central shaft 52. Central shaft 52 is embedded in the differential housing 50. The differential housing 50 is used as the gear train controller.

There are three possible movements for the differential gear assembly 40. If the differential housing 50 rotates, the rotation of the side gears 42 and 46 will be the same in both speed and direction. Top and bottom gears 54 and 56 orbit as the cage 50 rotates, since the central shaft 52 is connected to the differential housing 50.

If, however, the housing rotates and one of the side gears is fixed, the other side gear will rotate against gears 54 and 56 twice as fast as the housing and in the same direction. The gears 54 and 56 rotate around shaft 52 in opposite directions as the housing 50 rotates. Finally, a third movement is also possible. When the housing 50 is fixed, rotation of the input side gear 42 will cause equal and opposite rotation of output side gear 46.

The desired output shaft (26) speed of gearbox 20 is controlled by movements of the housing 50. The movements of the housing 50 are controlled by an electric motor 66 which engages a gear track 68 on the outer surface of housing 50. These elements may be considered to be the control means. Operation of the electric motor controls the rotation of the housing, i.e., zero electric motor rotation produces a stationary housing.

Consider now operation of the differential gearbox in combination with the floating gearbox assembly 20. The input shaft of the differential 44 is connected through gears 58 and 60 to the input shaft 24 of the floating gearbox 20. The differential outut shaft 48 is connected to the gearbox case 22 by means of a differential output shaft gear 62 and a gear surface 64 integral with the housing.

In start-up operation, the differential housing 50 is held fixed by the motor 66. Rotation of the input shaft 24 causes rotation of differential input shaft 44, which causes equal and opposite rotation of output shaft 48. This agrees with the start-up operation of the floating gearbox, wherein rotation of the input shaft 24 and counter rotation of gearbox case 22 results in no rotation of the output shaft 26.

When the differential housing, or controller, 50 is rotated by electric motor 66, the output of the differential gearbox shaft 48 begins to change. Several examples are given below and are tabulated in Table 1 below. For example, the differential housing is held fixed, the differential input shaft 44 is driven at −10 rpm by a 100 rpm input onto shaft 24 through a ten to one reduction by gears 60 and 58. The output shaft (48) gear 62 will then undergo a +10 rpm rotation. This +10 rpm movement produces a −10 rpm movement by the floating gearbox case 22. In this situation the output of the floating gearbox at output shaft 26 is zero rpm. If a zero to five rpm movement is applied to the differential housing 50, zero to ten rpm will be obtained at the differential output shaft 48. The floating gearbox case 22 will therefore rotate at −10 to zero rpm and a zero to +10 rpm rotation will be exhibited at main output shaft 26.

TABLE 1

| Ref. Num. | | | | | | |
|---|---|---|---|---|---|---|
| 50 | 24 | 44 | 48 | 22 | 26 | 26X |
| Name | | | | | | |
| housing | input | dif. input | dif. output | gearbox case | output | torque est. |
| RPM | | | | | | |
| 0 | +100 | −10 | +10 | −10 | 0 | idle-stopped |
| 0.5 | +100 | −10 | +9 | −9 | 1 | 100x |
| 1 | +100 | −10 | +8 | −8 | 2 | 50x |
| 2 | +100 | −10 | +6 | −6 | 4 | 25x |
| 3 | +100 | −10 | +4 | −4 | 6 | 16.7x |
| 4 | +100 | −10 | +2 | −2 | 8 | 13.5x |
| 5 | +100 | −10 | 0 | 0 | 10 | 10x |

Figure 2:
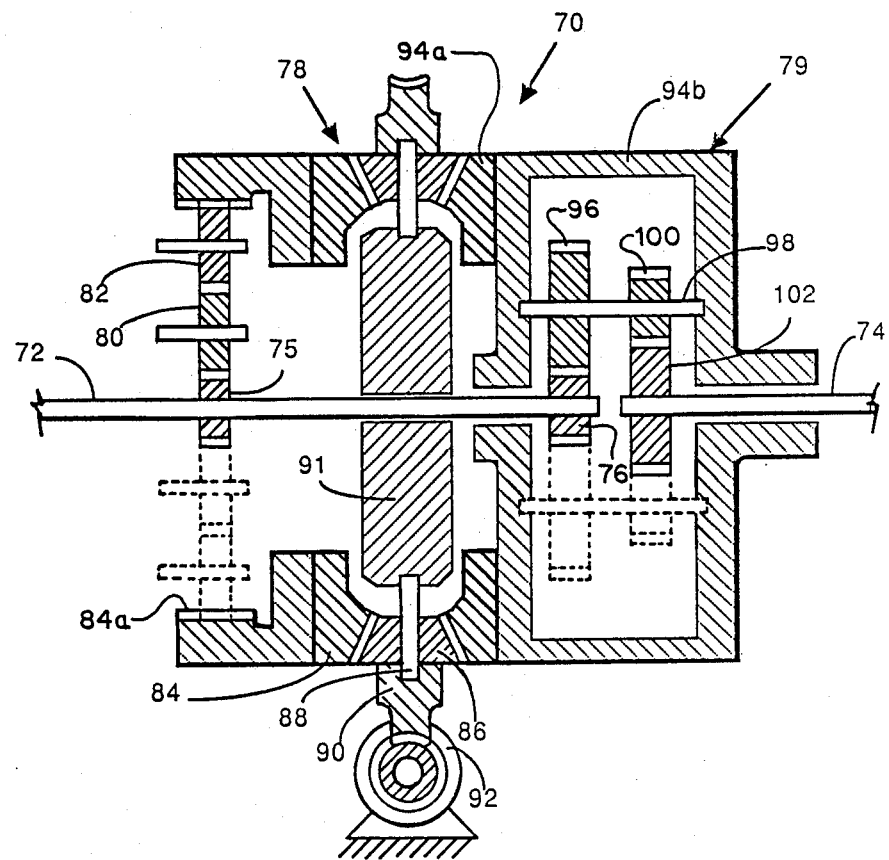
FIG. 2 is a cross-section view of a unified embodiment of a floating gearbox and differential assembly.

FIG. 2 illustrates an integral differential gearbox built into a floating gearbox assembly and operates identically with the simplified mechanism of FIG. 1. This combined differential and floating gearbox 70 comprises an input shaft 72 and an output shaft 74. The input shaft 72 acts upon the differential portion 78 of the combined gearbox by means of a shaft gear 75. The input shaft 72 also drives gears in the floating gearbox portion 79 by means of a sun gear 76.

In the differential portion 78, first differential gear 84 is driven by two idler gears 80 and 82 which rotate with shaft gear 75. Idler gear 82 engages the first differential gear 84 at an internal gear surface 84A. First differential gear 84 in turn engages three equally spaced spider gears 86. These spider gears are rotatable around their internal shafts 88 which are attached to casing portions 90 and 91. The casing portions are selectively rotated by a worm gear and electric motor 92 acting on worm casing 90. The spider gears also act to rotate a combined differential gear and floating gearbox case assembly 94. Differential gear portion 94A is directly acted upon by the spider gears and is permanently bonded to floating gearbox case 94b.

The floating gearbox 79 comprises two reduction gear sets for a total 10:1 input-output gear ratio reduction. The input shaft sun gear 76 powers an adjacent planetary gear 96. The planetary gear 96 shares an axial shaft 98 with planetary gear 100 that engages the output sun gear 102.

Operation of the combined gearbox mechanism 70 is tabulated in Table 2 below. Notice that initial operation of input shaft 72 at 100 rpm results in a reverse rotation of 10 rpm on gearbox case assembly 94. This results in zero output speed at shaft 74 as planetary gear 99 orbits around sun output gear 102. As is shown in the table, use of the motor 92 to rotate casing portion 90 and change spider gear rotation reduces floating gearbox case 94 rotation and results in incremental positive rotation of output shaft 74 at very high torque. This happens as gear 98 begins to act as an idler gear to power output gear 102. Higher speed rotation of casing portion 90, holding spider gears 86, produces a higher output speed and a lower torque at shaft 74.

TABLE 2

| Reference Numeral | | | | | |
|---|---|---|---|---|---|
| 72 | 84 | 90 | 94 | 74 | 74 |
| Name | | | | | |
| input | diff. gear | casing | gearbox case | output | torque |
| 100 | 10 | 0 | −10 | 0 | Idling |
| 100 | 10 | 0.1 | −9.8 | 0.2 | 500x |
| 100 | 10 | 0.5 | −9 | 1 | 100x |
| 100 | 10 | 1 | −8 | 2 | 50x |
| 100 | 10 | 2 | −6 | 4 | 25x |
| 100 | 10 | 3 | −4 | 6 | 16.7x |
| 100 | 10 | 4 | −2 | 8 | 13.5x |
| 100 | 10 | 5 | 0 | 10 | 10x |

Figure 3:
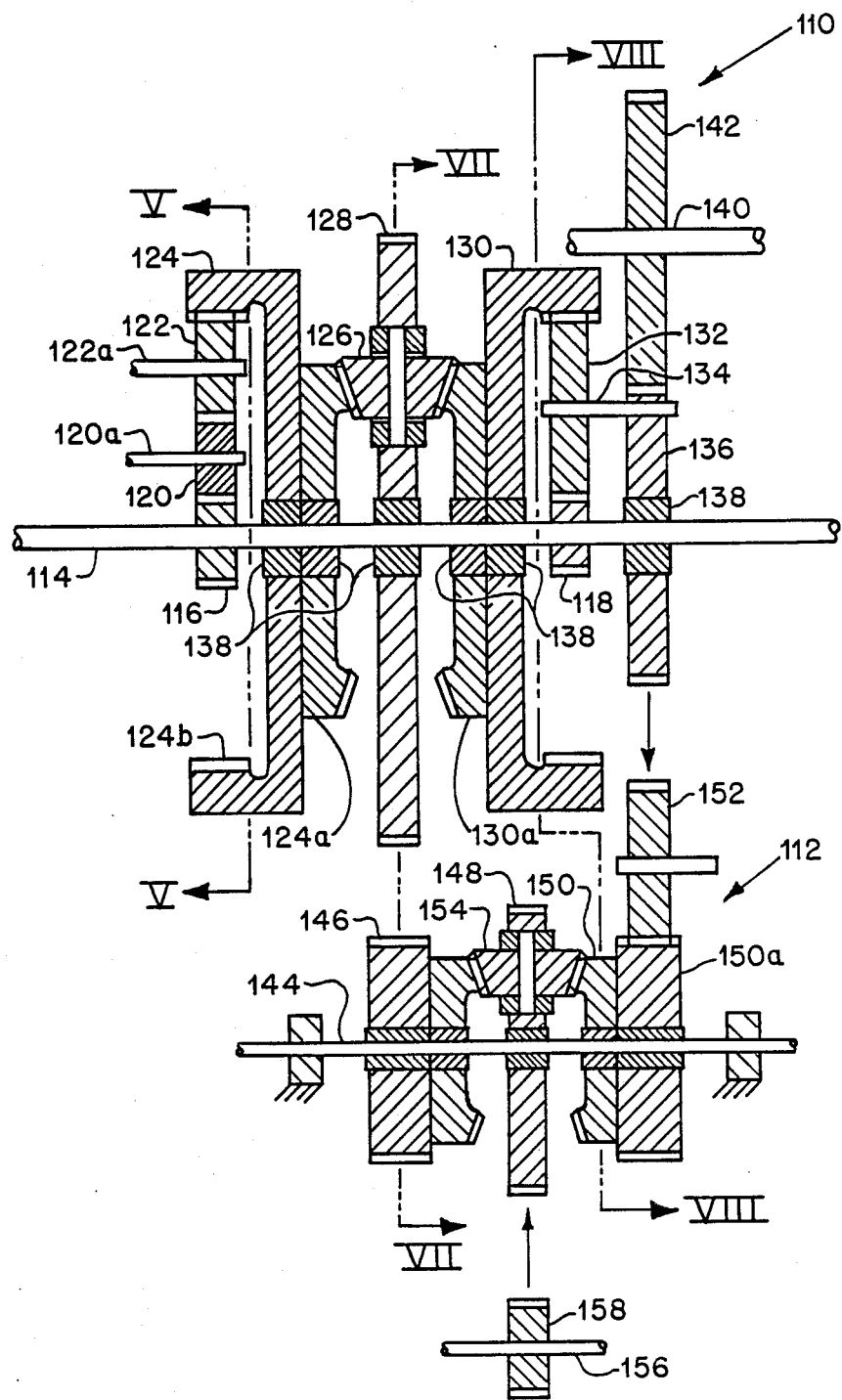
FIG. 3 is a cross-sectional view of a variable speed gear assembly which includes an epicyclic differential gear assembly and a feedback differential gear assembly.

FIG. 3 shows a version of a combination differential and floating gear set 110 with epicyclic output gearing, in which all components are symetrically designed in order to simplify gear set manufacturing and balancing requirements. This embodiment provides a feedback differential 112 for constant speed running. The combination differential and floating gear assembly of FIG. 3 also forms the basis for the device described in reference to FIG. 4. In order to more easily distinguish the embodiments, the device of FIG. 3 may be considered, in the context of FIG. 4, to be the master differential and floating gear assembly.

Figure 5:
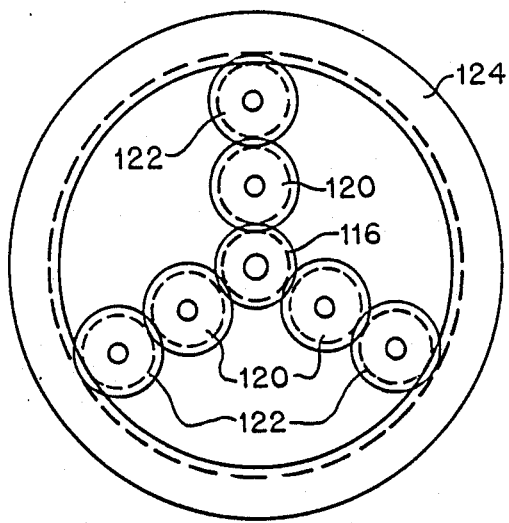
FIG. 5 is a cross-sectional view of a portion of the transmission of FIG. 3, taken along line V—V of FIG. 3.

The combination differential and floating gear set 110 has an input shaft 114, which drives input gear 116 and sun gear 118. Rotation of input gear 116 causes the rotation of idler gears 120 and 122, having shafts 120a, 122a respectively, which are affixed to a stationary gear box case (not shown). First differential gear 124 is driven on an internal gear surface 124b by the idler gear 122. This is shown in more detail in FIG. 5, where the idler gearing is shown to comprise three gear sets for balance purposes.

Figure 6:
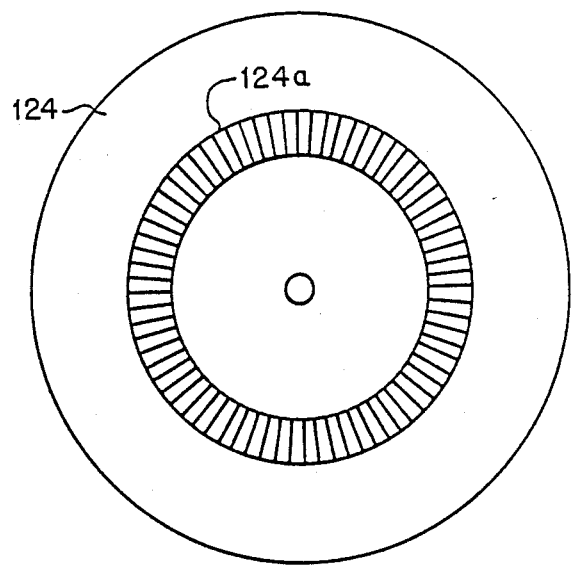
FIG. 6 is a side view of a transmission gear of FIG. 3.
Figure 7:
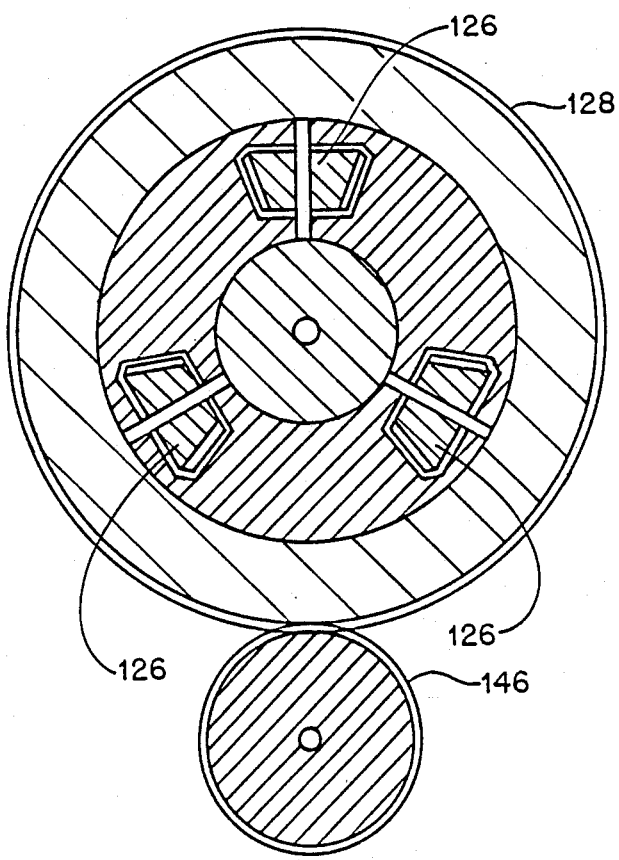
FIG. 7 is a cross-sectional view of a portion of FIG. 3, taken along line VII—VII.

First differential gear 124 has permanently attached to it an inner toothed section 124a which rotates against spider gear(s) 126 (FIGS. 6 and 7). In normal operation, three spider gears 126 will be provided. Assuming that a control gear 128 is held stationary, then a second differential gear 130 is driven by spider gear(s) 126 to counterrotate in relation to first differential gear 124.

Figure 8:
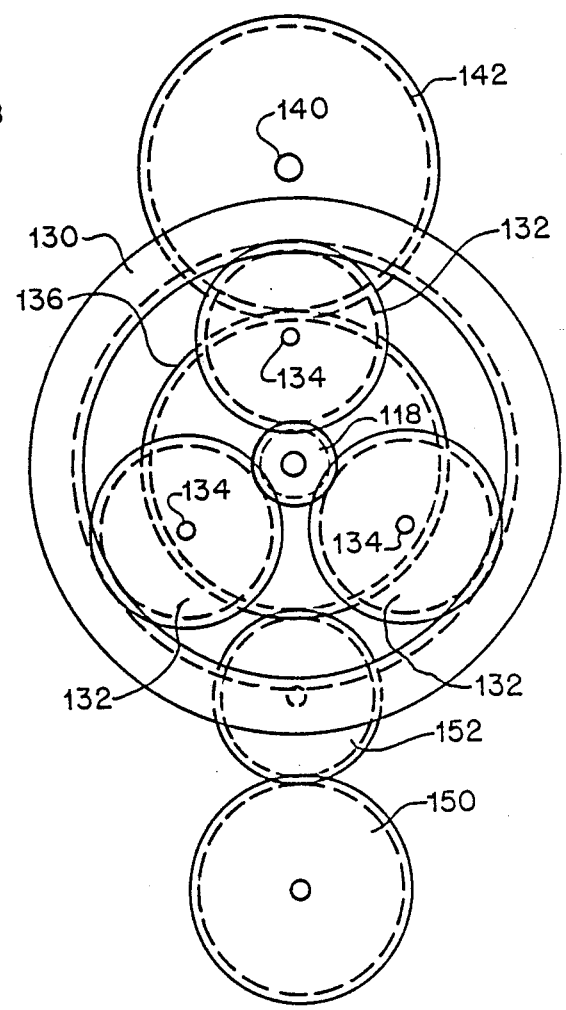
FIG. 8 is a cross-sectional view of a portion of FIG. 3, taken along line VIII—VIII.

This counterrotation will also be carried through by sun gear 118 and planetary gear(s) 132. The output planetary gear(s) 132, are positioned for rotation on shaft(s) 134 which is affixed to output/return gear 136 (FIG. 8). Planetary gears 132 act as idler gears, and return gear 136 is stationary. Notice that gears 124, 128, 130 and 136 have bearings 138 between them and the input shaft 114, so that they can rotate freely (FIG. 3).

The main output shaft 140 is connected to the drive train through a fixedly attached output gear 142 which engages output/return gear 136. Therefore, when the output shaft is stationary, planetary gear(s) shaft(s) 134 also remains stationary as the outer differential gear 130 counterrotates on its axis.

When gear set 132 is free running on shaft 134 and control gear 128 is stationary, output shaft 140 does not rotate because the linear speed of gear 118 is equal to the linear speed at gear 130. A rotational movement, however, can be added to control gear 128 either through an electric motor and worm set such as that discussed in relation to FIG. 2 or through the feedback differential arrangement discussed below. When control gear 128 is rotated, orbital movement of the spider gear(s) 126 will change the speed of gear 130 through engagement at inner portion 130A. The linear speed of gear 130 will therefore change and no longer equal the linear speed of sun gear 118. The unequal linear speed between gears 118 and 130 causes planetary gear 132 to orbit around sun gear 118 inside gear 130. When the planetary gear begins to orbit, it carries shaft 134 and gear 136 into a rotation that results in the rotation of output gear 142 and shaft 140. When the control gear 128 is driven from zero to 5 rpm, the output shaft rotation varies from zero to 10 rpm as tabulated in Table 3 below.

TABLE 3

| | Reference Numeral | | | | | | |
|---|---|---|---|---|---|---|---|
| | 114 | 124 | 128 | 130 | 136 | 146 | 148 | 150 |
| | | | | Name | | | | |
| | input | diff. gear | control gear | outer diff. gear | output return gear | feedback input | feedback control | feedback output |
| Steady | 100 | 10 | 0 | −10 | 0 | 0 | 0 | 0 |
| State | 100 | 10 | 1 | −8 | 2 | −4 | 0 | 4 |
| Speeds | 100 | 10 | 2 | −6 | 4 | −8 | 0 | 8 |
| In | 100 | 10 | 3 | −4 | 6 | −12 | 0 | 12 |
| R.P.M. | 100 | 10 | 4 | −2 | 8 | −16 | 0 | 16 |
| | 100 | 10 | 5 | 0 | 10 | −20 | 0 | 20 |

In the embodiments of FIGS. 1 and 2, continual input is required to maintain control gear rotation and output shaft speed. In the embodiment of FIG. 3, however, the addition of a feedback, or auxiliary, differential 112, creates a feedback loop to maintain output shaft speed.

Auxiliary differential 112 comprises a central shaft 144, around which rotates a first feedback differential gear 146, a feedback control gear 148 and a second feedback differential gear 150. Spider gear(s) 154 nested in feedback control gear 148 engage differential gears 146 and 150. The second differential gear 150 has an outer section 150A, which engages an output idler gear 152.

The output idler gear 152 engages return gear 136 of the combination differential and floating gear assembly 110 while first feedback differential gear 146 engages the master control gear 128. This arrangement permits gear 152 to sense rotation of the output/return gear 136 as planetary gear 132 corrects for any difference in linear rotational speed between gears 118 and 130. As a result, output motion is transferred to idler gear 152 and sent to feedback gears 150 and 154. The spider gears 154 transfer this motion to first feedback differential gear 146, which propagates the output rotation back to the master control gear 128. As a result of this arrangement, any output rotation at gears 132, 136, 142 and shaft 140 will maintain itself through continuing rotation of control gear 128 as dictated by the return loop of differential 112.

Linear changes in output speed are made by feedback control gear 148 which is rotated either by a motor and worm gear arrangement such as discussed in FIGS. 1 and 2, or the shaft and gear arrangement (156, 158) as shown in FIG. 3. Typically, shaft 156 would be connected through a reduction gear to an input power source that also powers main input shaft 114; a typical arrangement of this type is shown and discussed with reference to FIG. 4. When gear 158 is used to change the rotational speed of gear 148, changes propagate through the gear train and affect the output shaft speed (140). While output speed is maintained at shaft 140 through feedback differential 112, additional movement at output shaft 140 can be introduced linearly through movement of the feedback control gear 148. Examples of the operation of this device are defined in Table 4 below.

Please note that the table has been corrected for epicyclic movement. A cycle-to-cycle basis is used herein to show speed changes as effected by rotation of the feedback control gear 148. The linked gears, however, do not move sequentially one after the other. Rather, they move incrementally at approximately the same time.

TABLE 4

| | Reference Numeral | | | | | | | | |
|---|---|---|---|---|---|---|---|---|---|
| | 114 | 124 | 128 | 130 | 136 | 152 | 150 | 148 | 146 |
| | | | | Name | | | | | |
| | inpt | diff. gear | control | outer diff. | outpt | retrn idler | output feedback | feedback cntrl | feedback input |
| Start | 100 | 10 | 0 | −10 | 0 | 0 | 0 | 0 | 0 |
| 1st Cycle | | | | | | | | −1 | −2 |
| | 100 | 10 | 0.5 | −9 | 1 | −2 | 2 | | |
| 2nd Cycle | | | | | | | | −1 | −4 |
| | 100 | 10 | 1 | −8 | 2 | −4 | 4 | | |
| 3rd Cycle | | | | | | | | −1 | −6 |
| | 100 | 10 | 1.5 | −7 | 3 | −6 | 6 | | |
| 4th Cycle | | | | | | | | −1 | −8 |
| | 100 | 10 | 2 | −6 | 4 | −8 | 8 | | |
| 5th Cycle | | | | | | | | −1 | −10 |
| | 100 | 10 | 2.5 | −5 | 5 | −10 | 10 | | |
| 6th Cycle | | | | | | | | −1 | −12 |
| | 100 | 10 | 3 | −4 | 6 | −12 | 12 | | |
| 7th Cycle | | | | | | | | −1 | −14 |
| | 100 | 10 | 3.5 | −3 | 7 | −14 | 14 | | |
| 8th Cycle | | | | | | | | −1 | −16 |
| | 100 | 10 | 4 | −2 | 8 | −16 | 16 | | |
| 9th Cycle | | | | | | | | −1 | −18 |
| | 100 | 10 | 4.5 | −1 | 9 | −18 | 18 | | |
| 10th Cycle | | | | | | | | −1 | −20 |
| | 100 | 10 | 5 | 0 | 10 | −20 | 20 | | |
| 12th Cycle | | | | | | | | −1 | −24 |
| | 100 | 10 | 6 | 2 | 12 | −24 | +24 | | |
| 14th Cycle | | | | | | | | −1 | −28 |
| | 100 | 10 | 7 | 4 | 14 | −28 | +28 | | |

TABLE 4-continued

| | Reference Numeral | | | | | | | |
|---|---|---|---|---|---|---|---|---|
| | 114 | 124 | 128 | 130 | 136 | 152 | 150 | 148 | 146 |
| | | | | | | Name | | | |
| | inpt | diff. gear | control | outer diff. | outpt | retrn idler | output feedback | feedback cntrl | feedback input |
| 16th Cycle | | | | | | | | −1 | −32 |
| | 100 | 10 | 8 | 6 | 16 | −32 | +32 | | |
| 18th Cycle | | | | | | | | −1 | −36 |
| | 100 | 10 | 9 | 8 | 18 | −36 | +36 | | |
| 20th Cycle | | | | | | | | −1 | −40 |
| | 100 | 10 | 10 | 10 | 20 | −40 | +40 | | |
| 30th Cycle | | | | | | | | −1 | −60 |
| | 100 | 10 | 15 | 20 | 30 | −60 | +60 | | |
| 50th Cycle | | | | | | | | −1 | −100 |
| | 100 | 10 | 25 | 40 | 50 | −100 | +100 | | |
| 100th Cycle | | | | | | | | −1 | −200 |
| | 100 | 10 | 50 | 90 | 100 | −200 | +200 | | |
| n Cycle | | | | | | | | | |
| | 100 | 10 | n/2 | n-10 | n | −2n | +2n | | −2n |

At start-up, input shaft 114 is rotated at 100 rpm, gear 124 will rotate at 10 rpm and gear 130 will rotate at −10 rpm. This is due to the gear ratio between the gear 116 and gear 124. Initially, no other gears will rotate (except for the spider and idler gears). When one rotation is applied by gear 158 to feedback control gear 148, it will rotate at −1 rpm and gear 146 will undergo a −2 rpm rotation (cycle 1, Table 4). This induces a +0.5 rotation of master control gear 128. Finally, the output gear 136 will begin to rotate as gear(s) 132 begin to orbit gear 118. Gear 136 therefore undergoes positive rotation and drives output gear 142 and the output shaft 140 to a speed of 1 rpm.

In the feedback loop, gear 152 will be rotated by output gear 136 at −2 rpm, resulting in positive 2 rpm rotation of gear 150, which continues the rotation of gear 146 in order to keep the output shaft at a steady rotational speed.

If the feedback control gear 148 has rotated once and then ceased movement, the gear train remains at a constant output of 1 rpm, (assuming a constant input speed of 100 rpm). If, however, feedback control gear 148 continues to rotate, output speed will increase linearly as shown in the succeeding cycles of Table 4. In order to reduce speed, either input drive speed can be reduced, or a reverse rotation of feedback control gear 148 can be introduced to decrease the rotational speed of output shaft 140. In this type of differential gearing arrangement, it is possible to have the output speed exceed the input speed. A speed control device is, therefore, required to limit the maximum speed (and the minimum torque) for a desired application.

In summary, when the feedback control gear 148 is rotated in the reverse direction, the gear train output speed (136) increases in the forward direction linearly. Rotation of the feedback gear 148 in the forward direction linearly decreases output speed. When the controller gear 148 is at zero rpm, the gear train maintains a constant output speed.

This device can be made to operate under computer control. Speed and torque sensors can be provided at the input, output and control shafts in order to provide data to a pre-programmed microprocessor that can provide optimum speed and torque for the particular engine usage desired. Drive operation at very high speeds produces relatively low torque, while operation at very low speeds results in a very high torque output. The gear train must therefore be sufficiently sturdy to avoid damage when delivering a very high speed or torque load.

Figure 4:
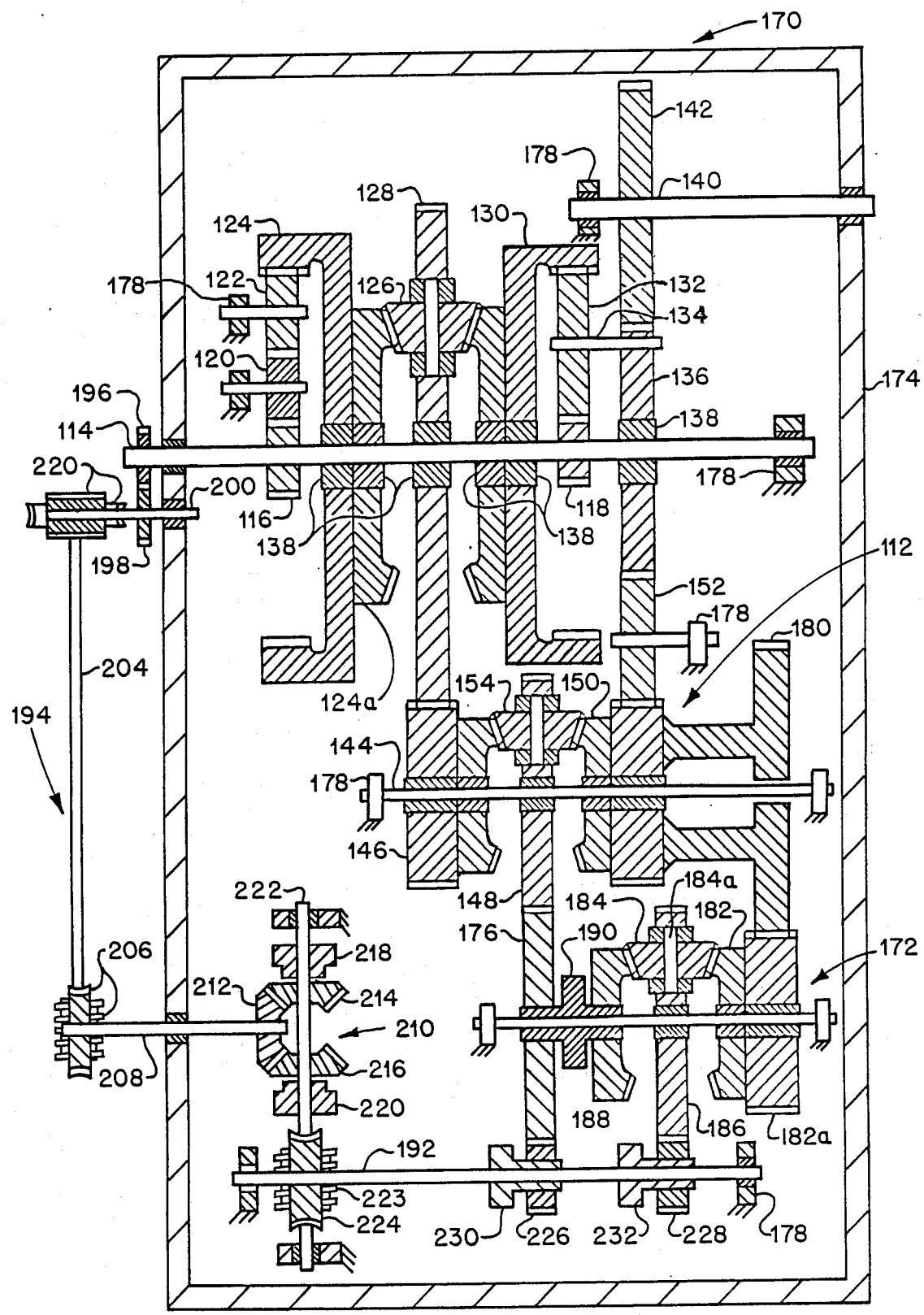
FIG. 4 is a cross-sectional view of a continuously variable transmission, capable of forward and reverse operation as well as geometric changes of output shaft rotation speed.

FIG. 4 is a cross-sectional view of a floating gear continuously variable transmission 170, having all the features of the embodiment of FIG. 3 (the master differential and floating gear assembly) and a feedback enhancement loop 172 for rapid acceleration and deceleration of output shaft rotation. Since the embodiment of FIG. 4 incorporates the apparatus of FIG. 3 almost exactly, the same reference numerals have been used for parts common to both figures. In order to further aid in understanding the device, a gearbox case 174 is shown enclosing the major elements of the continuously variable transmission. In addition, gearbox mountings 178 have been shown schematically, where appropriate, in order to locate stationary and rotating parts.

The primary difference between the floating gear transmission 170 of FIG. 4 and the embodiment of FIG. 3 is the addition of the second feedback loop formed by the enhanced feedback differential 172, which is associated with the feedback differential 112. In this embodiment of the feedback differential 112, an extension 180 is added to differential gear 150 adjacent to output gear 152. The extension 180 couples with a differentail gear extension 182A to feed back output shaft (140) speed to the enhanced feedback differential 172.

The enhanced feedback differential 172 is similar to the feedback differential 112 and has a first differential gear 182 coupled to spider(s) gear 184. The spider gear(s) have shaft(s) 184A, which are mounted in a control gear 186. A second differential gear 188 is driven by the spider gear(s) 184. Adjacent to second differential gear 188 is an electric clutch mechanism 190 for selective engagement and disengagement of the enhanced feedback differential 172 with return gear 176.

Electric clutch mechanisms are well known in the art and are commonly used for controlling devices such as automotive air conditioning compressors. When the electric clutch 190 is engaged, it causes joint rotation of differential gear 188 and return gear 176 to complete the enhanced feedback loop. When clutch 190 is de-energized, joint rotation of differential gear 188 with gear 176 ceases, thereby interrupting feedback rotation through the enhanced feedback differential 172.

A control shaft 192 is used for selective rotation of control gears 148, 186; it is mounted adjacent to the enhanced feedback differential 172. The control shaft 192 is rotated by the main input shaft 114 through a takeoff assembly 194.

The takeoff assembly 194 is connected to a takeoff gear 196 mounted on the main input shaft 114. Gear 196 couples to gear 198, which is mounted for rotation on a shaft 200. Gear 198 engages worm gear set 202 that connects to shaft 204. Rotation of shaft 204 through worm gear set 202 causes rotation of lower worm gear set 206 that rotates shaft 208. Shaft 208 extends inside the gear box 174 to a reversing gear set 210.

Reversing gear set 210 is operated by a bevel gear 212, positioned for rotation on shaft 208. Bevel gear 212 engages beveled side gears 214 and 216, which are selectively affixed to shaft 222 by electric clutches 218 and 220, respectively. Control shaft 222 is rotated in the forward or reverse directions, depending on which of the beveled side gears 214, 216 is operably connected to shaft 222.

Control shaft 222 has a fixed worm 223 which engages worm gear 224 for the rotation of main control shaft 192. Forward and reverse rotation of control shaft 192 delivers rotational movement to either the control gear 148 of the feedback differential or control gear 186 of the enhanced feedback differential as desired.

Two electric clutches are mounted on shaft 192 for selective rotation of gears 226 and 228 by shaft 192. Gear 226 is controlled by electric clutch 230, while gear 228 is controlled by clutch 232. Gear 226 engages gear 176 which directly engages control gear 148 of the feedback differential 112. When clutch 230 is engaged, gear 226 co-rotates with shaft 192 to impart rotation to control gear 148 through gear 176. In this mode of operation of the floating gear transmission 170 is identical in operation to transmission 110 of FIG. 3 and Table 4.

Rotation of control gear 148 causes linear rotational speed changes at output shaft 140 as detailed in Table 4, above. In the linear speed change embodiment (i.e., as in FIG. 3), speed changes are introduced through gear 226 and cease with disengagement of clutches 218 and 220. Clutch 230 remains engaged to allow worm 223 to hod gear 226 from rotating, resulting in constant output speed at shaft 140 (see speed hold in Table 5).

In order to produce rapid geometric changes of rotational output speed, clutch 230 is deactivated and clutch 232 is activated. This results in gear 226 being released from co-rotation, with shaft 192, while gear 228 begins co-rotation with the shaft. In this instance, clutch 190 is also activated to complete an enhanced feedback loop by including enhanced feedback differential 172. Control gear 186 is therefore rotated by shaft 192, which changes the rotational movement throughout the differential set 172, including gear 176, which connects to feedback control gear 148. This arrangement, however, differs from that of FIG. 3 in that rotation of output shaft 140 is fed back not only to feedback differential gearset 112, but into the enhanced feedback differential 172. This results in geometric speed changes at output shaft 140. In order to arrest the speed change and maintain a constant output speed, clutch 190 is disengaged, to drop the enhanced feedback differential out of the feedback loop. Clutches 218, 220 and 232 are also disengaged while clutch 230 remains engaged.

Operation of the electric clutches is summarized in Table 5 below. The five magnetic clutches are used to perform the five functions of the floating gear transmission. The five functions are linear forward, linear reverse, geometric forward, geometric reverse and speed hold. A five pole, five position electric switch may be used to perform these operations. In common applications such as in a motor vehicle transmission, the linear forward and linear reverse are not required and therefore may be omitted. Then the operation could be simplified to three modes of control: forward, speed hold, and reverse. A five pole, three position switch could perform this operation.

TABLE 5

| Movements | Electric Clutch Reference Numeral | | | | |
|---|---|---|---|---|---|
| | 218 | 220 | 230 | 232 | 190 |
| Start | Off | Off | On | Off | Off |
| Linearly Forward | On | Off | On | Off | Off |
| Speed Hold | Off | Off | On | Off | Off |
| Linearly Reverse | Off | On | On | Off | Off |
| Geometric Forward | On | Off | Off | On | On |
| Speed Hold | Off | Off | On | Off | Off |
| Geometric Reverse | Off | On | Off | On | On |
| Stop | Off | Off | Off | Off | Off |

The operations of the floating gearbox 170 are summarized in Table 6 below. For example, when a 100 rpm input speed is assumed at shaft 114 with gears 128, 148 and 186 at zero rpm, the output shaft 140 does not rotate (cycle 0). If electric clutches 190, 232 and 218 are engaged, clutches 230 and 220 are disengaged, and a 0.5 rpm control movement is applied to gear 186 for one minute, the output shaft begins to turn. At the end of the first minute, differential gear 188 has undergone one full rotation (1 rpm), gear 148 is at −1 rpm, gear 146 is at −2 rpm, gear 130 is at −9 rpm while output/return gear 136 is at 1 rpm (Table 6, cycle 1). The control gear 186 is then returned to zero rpm while output movement propagates through differential gear sets 112 and 172.

Rotation at output/return gear 136 therefore produces continued rotation of enhanced feedback differential 172 which continues to increase feedback amplification by rotating the speed control gear 148 of the feedback differential 112. Feedback differential 112 is also receiving the speed feedback through gear 150. Therefore, use of enhanced feedback differential 172 results in continued rotation of control gear 148 resulting in continuous output speed change, as is shown in cycles 1-5 of Table 6. At the end of the first minute, output speed at gear 136 is 1 rpm, after the second minute the output speed is 3 rpm. In the same manner, at the end of the thrid, fourth and fifth minute cycles the power output speed will be 9, 27 and 81 rpm, respectively. Since gear change is continuous, the gear speed changes from the beginning to the end of each cycle. The speeds of Table 6 are therefore only appropriate and have only been included at times when reasonable gear speed estimates can be made, i.e., at the beginning and end of cycles.

The output speed of the nth cycle will therefore be $3^{(n-1)}$ as tabulated cycle n of Table 6.

When the 0.5 rpm control movement is added continuously to gear 186, through all the cycles, then the speed in the first, second, third, fourth and fifth cycles (1A-5A) will be 1, 4, 13, 40, and 121 rpm respectively. The output speed of the nA cycle will be the sum $$\sum_{m=0}^{n-1} 3^m$$

as tabulated in FIG. 6 (cycles 1A-5A). For example, in the third cycle (3A), the output speed is $3^{(3-1)}+3^{(2-1)}+3^{(1-1)}$, which is $9+3+1=13$ rpm be achieved through the use of servomotors and a microprocessor with appropriate programming.

While the invention has been shown and described

TABLE 6

| | | Enhanced Feedback Differential | | | Feedback Differential | | | Floating Gear Differential | | | | |
|---|---|---|---|---|---|---|---|---|---|---|---|---|
| | | \multicolumn{12}{c}{ref. num.} |
| | | 114 | 182 | 186 | 188 | 150 | 148 | 146 | 124 | 128 | 130 | 136 | 152 |
| | | \multicolumn{12}{c}{name} |
| cyc | state | input | diff gear | ctrl gear | diff gear | diff gear | ctrl gear | diff gear | diff gear | mstr ctrl gear | diff gear | output | rtn idl |
| 0 | Strt | 100 | 0 | 0 | 0 | 0 | 0 | 0 | 10 | 0 | −10 | 0 | 0 |
| 1 | bgn | 100 | | 0.5 | | | | | 10 | | −10 | | |
|   | end | 100 | — | | 1 | | −1 | −2 | | 0.5 | −9 | 1 | — |
| 2 | bgn | 100 | −2 | 0 | 2 | 2 | | | 10 | | | | −2 |
|   | end | | | 0 | | | −2 | −6 | | 1.5 | −7 | 3 | |
| 3 | bgn | 100 | −6 | 0 | 6 | 6 | | | 10 | | | | −6 |
|   | end | 100 | | 0 | | | −6 | −18 | | 4.5 | −1 | 9 | |
| 4 | bgn | 100 | −18 | 0 | 18 | 18 | | | 10 | | | | −18 |
|   | end | 100 | | 0 | | | −18 | −54 | | 13.5 | 17 | 27 | |
| 5 | bgn | 100 | −54 | 0 | 54 | 54 | | | 10 | | | | −54 |
|   | end | 100 | | 0 | | | −54 | −162 | | 40.5 | 71 | 81 | |
| n | constant | | | | | | | | | | | $3(n-1)$ | |
| 0 | reset | 100 | 0 | 0 | 0 | 0 | 0 | 0 | 10 | 0 | −10 | 0 | 0 |
| 1A | bgn | 100 | | 0.5 | 1 | | −1 | −2 | 10 | | −10 | | |
|   | end | — | | | | | | | | 0.5 | −9 | 1 | — |
| 2A | bgn | 100 | −2 | 0.5 | | 2 | | | 10 | | | | −2 |
|   | end | | | | 3 | | −3 | −8 | | 2.0 | −6 | 4 | |
| 3A | bgn | 100 | −8 | 0.5 | | 8 | | | 10 | | | | −8 |
|   | end | | | | 9 | | −9 | −26 | | 6.5 | 3 | 13 | |
| 4A | bgn | 100 | −26 | 0.5 | | 26 | | | 10 | | | | |
|   | end | | | | 27 | | −27 | −80 | | 20 | 30 | 40 | |
| 5A | bgn | 100 | −80 | 0.5 | | 80 | | | 10 | | | | −80 |
|   | end | | | | 81 | | −81 | −242 | | 60.5 | 111 | 121 | |
| $n_A$ | bgn | constant | | | | | | | | | | $\sum_{m=0}^{n-1} 3m$ | |

In all of the above embodiments, the size of the gears may be varied in order to obtain desired range of speed and torque. The gear ratio may continuously be varied to provide the desired rate of speed enhancement and the input power for the most efficient power output.

Referring again to Table 6, the output gear ratio of cycles 1A-5A of the floating gear transmission is 1, 4, 13, 40 and 121. This gear ratio is comparable to the transmission gear ratio of a conventional five speed motor vehicle or an automatic transmission with overdrive. The floating gear transmission 170, however, establishes these gear ratios in a smooth, continuously variable manner, without the abrupt gear shifting of conventional transmissions. Another advanced feature of the floating gear transmission is the very high torque at near zero starting speed. This high torque is required most at start up and at low speeds to overcome starting friction and inertia.

If the floating gear transmission is used in motor vehicles, the engine is started in speed hold mode, then switched to forward (or reverse) mode. While the output speed is advancing, a proper engine running speed is maintained by the throttle.

It is possible to keep the minimum output torque at the designed output speed by altering the mode control and engine acceleration to obtain the best operating efficiency. Speed/torque sensors may be placed at the input and output shafts of the transmission to monitor the prime mover (engine) and transmission output. These sensor impulses can be fed to a microprocessor. The most efficient speed and torque control could then be achieved through the use of servomotors and a microprocessor with appropriate programming.

While the invention has been shown and described with reference to the preferred embodiments thereof, it will be understood by those skilled in the art that various changes in substance and form can be made therein without departing from the spirit and scope of the invention as defined in the appended claims. For example, continuously variable transmissions can be used in a wide variety of devices and should not be limited to motor vehicles.

What is claimed is:

1. A variable speed drive assembly comprising:
   (a) floating gear assembly having an input and an output shaft;
   (b) a primary differential gear assembly mechanically interconnected with said floating gear assembly such that a mechanical feedback loop is established between said floating gear assembly and said primary differential gear assembly for controlling speed of said output shaft; and
   (c) a control means comprising a control gear directly interconnected with said primary differential gear assembly such that rotation of said control means controls the rotational speed of said output shaft wherein said output shaft is held stationary when said control gear is stationary.

2. The variable speed drive assembly of claim 1 wherein said control means further comprises:
   a feedback differential gear assembly comprising a control shaft and a feedback control gear wherein said feedback differential gear assembly is interconnected with a differential control gear of said primary differential gear assembly and said output shaft of said floating gear assembly for indefinitely maintaining the rotation speed of said output shaft as periodically reset by rotation of said feedback control gear wherein rotation of said feedback control gear effects linear changes in rotation of said output shaft.

3. The variable speed drive assembly of claim 2 wherein said control means further comprises an enhanced feedback differential gear assembly which is interconnected with said feedback differential gear assembly at a feedback differential control gear and is also interconnected, through said feedback differential gear assembly to said output shaft, said enhanced feedback differential assembly having an enhanced feedback differential control gear, rotation of which induces geometric changes in the rotational speed of said output shaft.

4. A continuously variable gear transmission comprising:
   (a) an input shaft;
   (b) a master differential and floating gear assembly comprising:
      (i) a first master gear connected to said input shaft by idler gears;
      (ii) a master control gear connected to said first master gear by a spider gear;
      (iii) a second master gear connected to said first master gear and said master control gear by said spider gear, and
      (iv) an output gear connected to said second master gear by planetary idler gears;
   (c) an output shaft connected to said output gear;
   (d) a feedback differential gear assembly which connects to said output shaft and engages said master control gear, said feedback differential gear assembly forming a control feedback loop between said output shaft and said master differential gear assembly in order to maintain output shaft rotational speed; and
   (e) a speed control means connected to said feedback differential gear assembly for introducing output shaft speed changes into said feedback loop.

5. The continuously variable gear transmission of claim 4 further comprising an electric motor for rotating said speed control means.

6. The continuously variable gear transmission of claim 4 wherein said feedback differential gear assembly comprises:
   (a) a first differential gear connected to the master control gear of the master differential gear assembly;
   (b) a feedback control gear connected to said first differential gear by a spider gear and engaging a speed control gear of a speed control means;
   (c) a second differential gear connected to said feedback control gear by said spider gear and connected to said output gear of said master differential gear assembly in order to complete a mechanical feedback loop to maintain output shaft speed.

7. The continuously variable gear transmission of claim 6 wherein said speed control means comprises a reversible speed control shaft connected to a source of shaft rotation.

8. The continuously variable gear transmission of claim 7 wherein said speed control shaft can be selectively engaged with an electric motor.

9. The continuously variable gear transmission of claim 4 further comprising an enhanced feedback mechanism for causing geometric changes of output shaft speed.

10. The continuously variable gear transmission of claim 7 wherein said enhanced feedback mechanism for causing geometric speed changes comprises an enhanced feedback differential having:
   a first differential gear connected for operation with the output gear of said master differential and floating gear assembly;
   a central control gear connected to said first differential gear by a spider gear and connected to a speed control gear of said speed control means, and
   a second differential gear connected to said central control gear by a said spider gear and also connected to the feedback differential gear assembly to complete a mechanical feedback loop with said master differential and floating gear assembly that causes geometric speed changes at said output shaft when said central control gear is rotated.

11. The continuously variable gear transmission of claim 10 further comprising a primary clutch mechanism for selective engagement of the enhanced feedback differential with said feedback differential gear assembly.

12. The continuously variable gear transmission of claim 11 further comprising a secondary clutch mechanism for selective engagement of said central control gear of the enhanced feedback differential with said speed control gear of said speed control means.

13. The continuously variable gear transmission of claim 12 further comprising a tertiary clutch for selective direct engagement of said feedback differential gear assembly with said speed control means in order to introduce linear speed changes at said output shaft by bypassing said enhanced feedback differential.

14. A gear transmission device for varying output shaft speed relative to input shaft speed comprising:
   (a) an input shaft;
   (b) a master differential and floating gear assembly comprising:
      (i) a first floating gear connected to said input shaft by idler means;
      (ii) a master control gear rotatably connected to said first floating gear;
      (iii) a second floating gear rotatably connected to said master control gear, and
      (iv) an output gear connected to said second floating master gear by idler means;
   (c) an output shaft connected to said output gear;
   (d) a feedback differential gear assembly which engages said output shaft and said master control gear, said feedback differential gear assembly forming a control feedback loop between said output shaft and said master differential and floating gear assembly in order to maintain output shaft rotational speed; and
   (e) speed control means connected to said feedback differential gear assembly for introducing output shaft speed changes into said feedback loop.

15. The gear transmission device for varying output shaft speed relative to input shaft speed of claim 14 further comprising an electric motor for rotating said speed control means.

16. The gear transmission device for varying output shaft speed relative to input shaft speed of claim 14 wherein said feedback differential gear assembly comprises:

(a) a first differential gear rotatably connected to the master control gear of the master differential and floating gear assembly;

(b) a feedback control gear rotatably connected to said first differential gear and engaging a speed control means;

(c) a second differential gear rotatably connected to said feedback control gear and connected to said output gear of said master differential gear assembly in order to complete a mechanical feedback loop to maintain output shaft speed.

17. The gear transmission device for varying output shaft speed relative to input shaft speed of claim 16 further comprising an enhanced feedback mechanism for causing geometric changes of output shaft speed.

18. The gear transmission device for varying output shaft speed relative to input shaft speed of claim 17 wherein said enhanced feedback mechanism for causing geometric acceleration comprises an enhanced feedback differential having:

a first differential gear connected for operation with the output gear;

a central control gear rotatably connected to said first differential gear and to said speed control means, and a second differential gear rotatably connected to the feedback control gear in order to complete a mechanical feedback loop that causes geometric speed changes at said output shaft when said central gear is rotated.

19. The gear transmission device for varying output shaft speed relative to input shaft speed of claim 18 further comprising a primary clutch mechanism for selective engagement of the enhanced feedback differential with said feedback control gear.

20. The gear transmission device for varying output shaft speed relative to input shaft speed of claim 18 further comprising a secondary clutch mechanism for selective engagement of said central control gear of the enhanced feedback differential with said speed control means.

* * * * *

UNITED STATES PATENT OFFICE
CERTIFICATE OF CORRECTION

Patent No. 4,854,190                    Dated August 8, 1989

Inventor(s) Vann Yuen Won

It is certified that error appears in the above-identified patent and that said Letters Patent is hereby corrected as shown below:

On the title page delete "Assignee: United States of America as represented by the Secretary of the Air Force, Washington, D.C."

In column 1, between 14, insert the following paragraph:

-- STATEMENT OF GOVERNMENT INTEREST

The invention described herein may be manufactured and used by or for the Government for governmental purposes without the payment of any royalty thereon. -- .

Col. 1, line 4, insert -- BACKGROUND OF THE INVENTION--

In column 1, line 57, delete "decelara-" and insert therefor -- decelera- --.

In column 8, line 34, after "has" insert -- not --.

Signed and Sealed this

Second Day of July, 1991

*Attest:*

HARRY F. MANBECK, JR.

*Attesting Officer*                    *Commissioner of Patents and Trademarks*